United States Patent [19]

Wakabayashi

[11] Patent Number: 4,545,666
[45] Date of Patent: Oct. 8, 1985

[54] LIGHT EMISSION BLOCKING DEVICE OF A CAMERA CAPABLE OF EFFECTING FLASHLIGHT PHOTOGRAPHY

[75] Inventor: Hiroshi Wakabayashi, Yokohama, Japan

[73] Assignee: Nippon Kogaku K.K., Tokyo, Japan

[21] Appl. No.: 550,639

[22] Filed: Nov. 10, 1983

[30] Foreign Application Priority Data

Nov. 18, 1982 [JP] Japan ............................ 57-202441

[51] Int. Cl.$^4$ ............................................. G03B 15/05
[52] U.S. Cl. .................................. 354/412; 354/149.11
[58] Field of Search ................. 354/21, 215, 419, 413, 354/129, 412, 217, 289.12, 149.11, 145.1

[56] References Cited

U.S. PATENT DOCUMENTS 3,769,886 11/1973 Uno et al. ........................... 354/456
4,342,509 8/1982 Wakabayashi et al. ............. 354/214
4,420,236 12/1982 Taniguchi et al. .................... 354/21

*Primary Examiner*—L. T. Hix
*Assistant Examiner*—David M. Gray
*Attorney, Agent, or Firm*—Fitzpatrick, Cella, Harper & Scinto

[57] ABSTRACT

A camera usable with a flash unit and having a roll film loaded in the camera housing thereof comprises release means operable by an operator for photographing of an object to be photographed, means for driving the flash unit in response to the release means so that light may be emitted from the flash unit, means for advancing the roll film in the camera housing, and means for blocking the operation of the driving means in response to the release means until a portion corresponding to the first frame of the roll film to be exposed during the first photography effected using the roll film loaded in the camera housing is disposed at a predetermined position in the camera housing.

9 Claims, 4 Drawing Figures

LIGHT EMISSION BLOCKING DEVICE OF A CAMERA CAPABLE OF EFFECTING FLASHLIGHT PHOTOGRAPHY

BACKGROUND OF THE INVENTION

1. Field of the Invention

This invention relates to a camera capable of effecting flashlight photography by the use of a flash unit contained in or removably mounted to the camera.

2. Description of the Prior Art

In a camera using a roll film contained in a film magazine, it is necessary to wind up the leader portion and subsequent portion of the film in advance before the first photography is effected after a fresh film has been loaded into the camera. This wind-up is generally called idle photography and idle feeding. These are carried out to take up the leading end portion of the film already exposed during film loading onto the spool until the film counter indicates the first frame and to cause the unexposed portion of the film to be opposed to the photo-taking lens. Idle photography generally refers to the operation of alternately repeating the depression of the release button and the wind-up of one frame until the film counter indicates the first frame. Idle feeding refers to the operation of continuously winding up the film by several frames until the film counter indicates the first frame, and does not require the release button to be depressed many times. However, some of cameras of the type in which film is wound up by a motor require the release button to be depressed once to start idle feeding.

In such cameras which require the release button to be depressed during the preparatory film wind-up taking place before the actual photographing is initiated and which are capable of effecting flashlight photography, the flast unit has come to emit light if the flash unit is in a condition capable of emitting light when the release button is depressed for the preparatory wind-up. This light emission has not contributed to photographing but has only consumed the battery wastefully.

SUMMARY OF THE INVENTION

It is an object of the present invention to overcome the above-noted disadvantage and to provide a camera designed such that the flash unit does not emit light for the depression of the release button effected during the preparatory wind-up.

The invention will become fully apparent from the following detailed description thereof taken in conjunction with the accompanying drawings.

DESCRIPTION OF THE PREFERRED EMBODIMENTS

Figure 1:
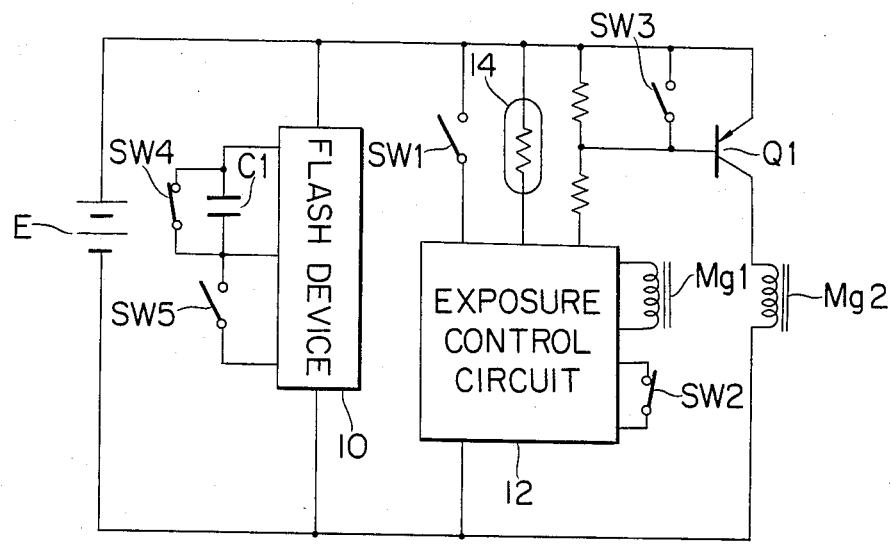
FIG. 1 is a circuit diagram of a device according to a first embodiment of the present invention.

In the circuit construction according to a first embodiment of the present invention shown in FIG. 1, an exposure control circuit 12 and a flash unit 10 are parallel-connected to a power source E. A normally open switch SW1 is series-connected to the power supply path from the power source E to the exposure control circuit 12. This switch SW1 remains closed as long as a release button provided in the camera housing is depressed to a first stroke which exceeds one-half of the full depression stroke thereof. A photoconductive element 14 for detecting the brightness of an object to be photographed, a normally closed switch SW2 adapted to be opened upon opening operation of the shutter and thereby produce an exposure starting signal, an electromagnet Mg1 energized to close the shutter, and the base of a PNP transitor Q1 are connected to the respective terminals of the exposure control circuit 12. The exposure control circuit 12 is of a conventional construction which has a comparison circuit, a time counting circuit, etc., receives electrical signals from the circuit elements SW1, SW2, 14 and Q1, counts the exposure time and drives the electromagnet Mg1. A normally open switch SW3 is connected between the base and emitter of the transistor Q1 and an electromagnet Mg2 is connected to the collector of the transistor Q1. The switch SW3 is of a construction as shown in U.S. Pat. No. 3,769,886, for example, and is controlled by the film counter and remains closed during the time from after loading of an unused film until the film counter indicates the first frame, that is, until idle photography or idle feeding is completed. The light-emitting portion of the flash unit 10 is designed to be normally positioned within the camera housing and displaced to a position upwardly projected from the camera housing during use. The electromagnet Mg2, by being energized, may displace the light-emitting portion of the flash unit 10 from its housed position to its projected position. A construction relating to such projection of the flash unit is shown in Japanese Laid-opn Utility Model Application No. 27622/1979, for example. A normally closed switch SW4 is parallel-connected to a trigger capacitor C1 and remains opened as long as the light-emitting portion of the flash unit 10 is in its projected position. The trigger capacitor C1 is connected to the light emission initiating circuit of the flash unit 10 and may initiate the light emission of the flash tube by the discharge current thereof. A normally open switch SW5 is a conventional synchro switch series-connected to the capacitor C1 and adapted to be closed when the shutter becomes fully open.

Description will now be made of the operation during normal photography after idle photography or idle feeding has been terminated.

When the release button is depressed for photography, the switch SW1 is closed at the first stroke of its depression stroke and power is supplied to the exposure control circuit 12. If at that time the brightness of the object to be photographed is lower than a predetermined value and flashlight photography is required, the exposure control circuit 12 detects it by comparing the output of the photoconductive element 14 with a reference voltage and reduces the base potential of the transistor Q1 from a high potential to a low potential, thereby rendering the transistor Q1 conductive. The electromagnet Mg2 is energized thereby to displace the light-emitting portion of the flash unit 10 from its housed position to its projected position. Thereupon, the switch SW4 is opened. When the release button is depressed to the second stroke of its depression stroke, the mechanism within the camera operates to open the shutter. In response thereto, the switch SW2 is opened and counting of the exposure time is started in the circuit 12. When the shutter becomes fully open, the switch SW5 is closed and the discharge current of the capacitor C1 flows to the light emission initiating circuit of the flash unit 10, whereby the light emission of the flash tube is initiated. When a predetermined time elapses, the circuit 12 causes an energizing current to flow to the electromagnet Mg1, thereby closing the shutter.

During idle photography or idle feeding, the film counter does not indicate the first frame and therefore, the switch SW3 remains closed and the transistor Q1 remains non-conductive. Accordingly, even if the brightness of the object to be photographed is low, the electromagnet Mg2 is not energized and the light-emitting portion of the flash unit 10 is not displaced from its housed position to its projected position.

Instead of the switch SW3, a normally closed switch adapted to remain open until the film counter indicates the first frame may be connected in series between the base of the trnasistor Q1 and the exposure control circuit 12.

Alternatively, a switch similar to the switch SW3 may be series-connected to the capacitor C1 so that during idle photography, the discharge current of the capacitor C1 may be prevented from flowing to the light emission initiating circuit, thereby inhibiting the light emission of the flash unit. In this case, however, if the brightness of the object to be photographed is low, the light-emitting portion of the flash unit will be displaced to its projected position.

Figure 2:
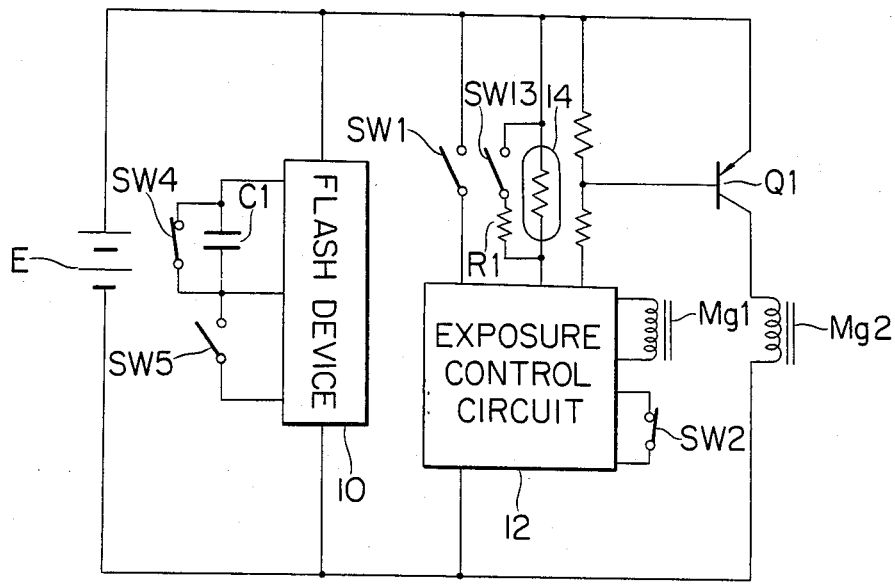
FIG. 2 is a circuit diagram of a device according to a second embodiment of the present invention.

As shown in FIG. 2, a normally open switch SW13 operable in response to the film counter like the switch SW3 of FIG. 1 and a resistor R1 in series therewith are parallel-connected to the photoconductive element 14, whereby a current like that when the brightness of the object to be photographed is high is input to the exposure control circuit 12 until the film counter indicates the first frame. Accordingly, even though the release button is depressed during idle photography or idle feeding, the light-emitting portion of the flash unit 10 will not be displaced to its projected position and thus will not emit light.

Figure 3:
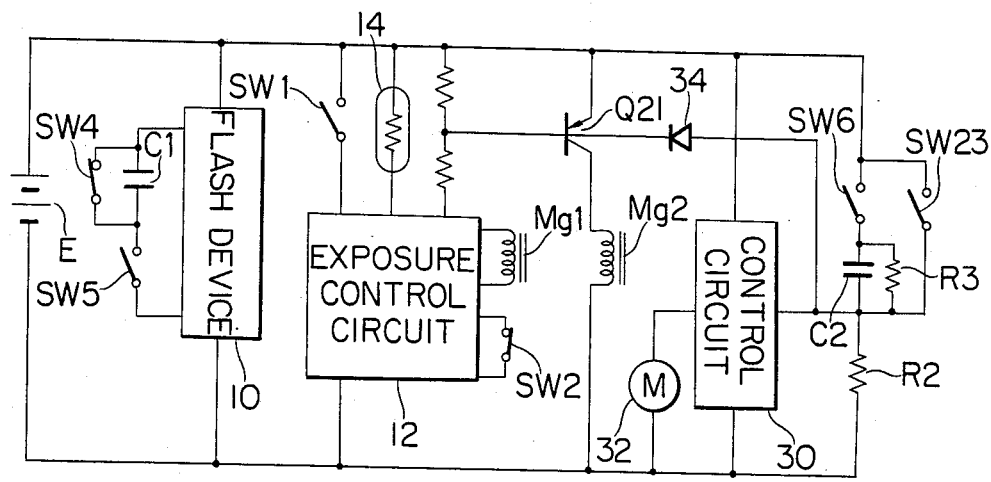
FIG. 3 is a circuit diagram of a device according to a third embodiment of the present invention.

An embodiment shown in FIG. 3 is one in which the present invention is applied to a camera of the type in which the film wind-up during idle feeding and normal photography is effected by a motor contained within the camera housing.

In FIG. 3, a motor control circuit 30 drives a motor 32 upon depression of the release button to its second stroke. That is, when the release button is depressed after loading of a film into a predetermined position in the camera housing and shutter operation is completed, the circuit 30 starts the motor to continuously wind up the film until the film counter indicates the first frame. During the photography after that, the release button is depressed to its second stroke and the motor 32 is started each time shutter operation is completed, thereby winding up the film by each frame. A capacitor C2 and a resistor R2 together constitute a timer circuit. A normally open switch SW6 is series-connected to the capacitor C2 and adapted to be closed in response to the initiation of film wind-up and opened in response to the completion of wind-up of one frame. A normally open switch SW23 is controlled by the film counter and remains closed during the time from after the loading of a film until the film counter indicates the first frame, i.e., during idle feeding. The timer circuit C2, R2 starts time counting in response to the closing of the switch SW6 resulting from the initiation of film wind-up during normal photography, i.e. when the switch SW23 is open, and supplies a time count signal of low potential to the motor control circuit 30 when charging of the capacitor C2 is completed after lapse of a predetermined time, whereby the circuit 30 cuts off the supply of power to the motor. This predetermined time is set so as to be longer than the time required for the motor 32 to wind up the film by one frame. Accordingly, usually, before the predetermined time elapses, film wind-up is completed and the switch SW6 is opened to cut off the charging current to the capacitor C2 and therefore, the time count signal is not put out, but when photographing of all frames of the film is completed and the supply of the film from the film magazine is stopped, an overload is applied to the motor which tries to further wind up the film and thus, the motor becomes unrevolvable, whereupon the time count signal is put out. After completion of wind-up, the charging current of the capacitor C2 is discharged through a resistor R3.

During idle feeding, the switch SW23 remains closed, so that the timer circuit C2, R2 does not operate, thus enabling the film to be continuously wound up by some frames.

Since this switch SW23 is also parallel-connected between the base and emitter of a transistor Q21, it inhibits the flash unit 10 from emitting light during idle feeding as does the switch SW3 of FIG. 1.

A diode 34 inserted between the base of the transistor Q21 and the switch SW23 is for preventing the transistor Q21 from being rendered conductive by the time count signal.

Figure 4:
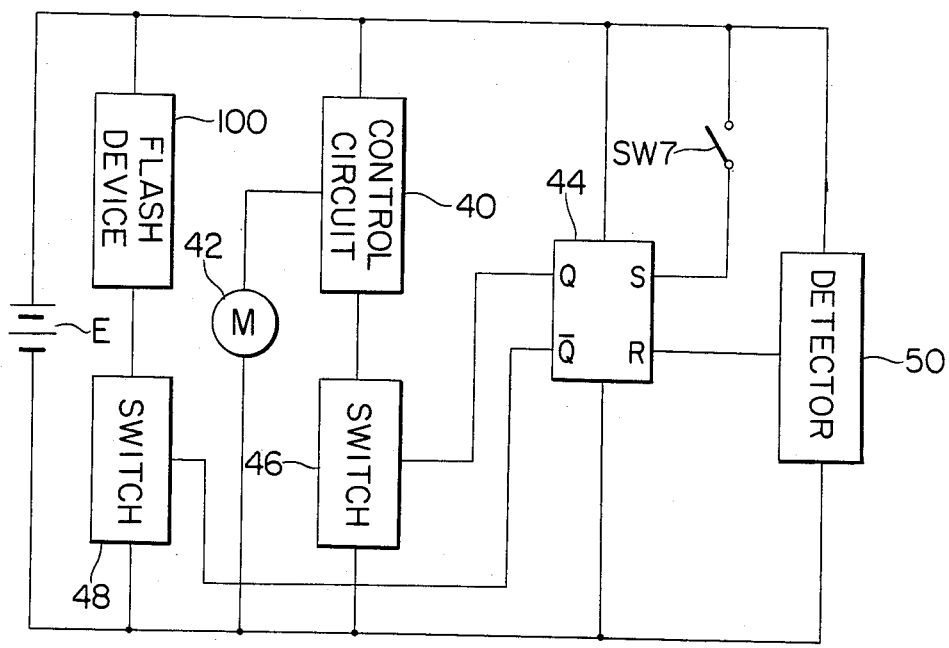
FIG. 4 is a circuit diagram of a device according to a fourth embodiment of the present invention.

An embodiment shown in FIG. 4 is one in which the present invention is applied to a camera of the type in which the motor is started by the first operation of the release button after loading of a film to draw out all of the unexposed film in the film magazine at a time and take up it on the spool and thereafter the operation of exposure and rewinding of the film into the magazine by one frame is repeated each time the release button is depressed. The camera of such type is shown in U.S. Pat. No. 4,342,509, for example. That is, in the present embodiment, the operation of taking up all of the unexposed film onto the spool is preparatory wind-up. In FIG. 4, a normally open switch SW7 is closed upon the first depression of the release button to its first stroke after film loading to thereby set an RS flip-flop 44. The Q output of the flip-flop 44 is connected to the control input of a switching circuit 46 and the $\overline{Q}$ output of the flip-flop 44 is connected to the control input of a switch circuit 48. The switching circuit 46 controls the supply of power to a motor circuit 40, and the switching circuit 48 controls the supply of power to a flash unit 100. An over-current detecting circuit 50 monitors the value of a current flowing to the motor 42 and detects an over-current flowing when the motor 42 is stopped by an over-load, thereby resetting the flip-flop 44.

The operation of the present embodiment will be described hereinafter. When the release button is depressed after a film has been loaded, the switch SW7 is closed. Along therewith, a signal of high potential is input to the set input S of the flip-flop 44, whereby the flip-flop 44 is set. The Q output of the flip-flop 44 is inverted to a high potential and switches on the switching circuit 46. Thereby, the motor control circuit 40 starts the motor 42, thereby causing the unexposed film in the magazine to be taken up onto the spool. In the meantime, the switching circuit 48 is in its OFF state because a signal of lower potential than the $\overline{Q}$ output of the flip-flop 44 is input thereto, and the flash unit 100 cannot emit light even if the release button is depressed to its second stroke to operate the shutter. When the exposed film is all taken up, the motor 42 becomes unrevolvable due to an over-load and therefore, an overcurrent flows to the motor. The detecting circuit 50 detects this and supplies a signal of high potential to the reset input R of the flip-flop 44, thus resetting the flip-flop 44. The Q output and $\overline{Q}$ output of the flip-flop 44 change to a low potential and a high potential, respectively, so that the switching circuit 46 is switched off and the switching circuit 48 is switched on, and the supply of power from the motor control circuit 40 to the motor 42 is cut off and thus, the flash unit 100 becomes capable of emitting light.

While the circuits of the present invention have been described by mentioning only the circuits necessary for preparatory wind-up, the motor control circuit 40 and the flash unit 100 are controlled by an unshown separate circuit during photography and operate at a predetermined timing.

I claim:

1. A camera usable with a flash unit and having a roll film loaded in the camera housing thereof, said camera comprising:
    release means operable by an operator for photographing of an object to be photographed;
    means for driving said flash unit in response to said release means so that light may be emitted from said flash unit;
    means for advancing said roll film in said camera housing in response to said release means;
    means for blocking the operation of said driving means until a portion corresponding to the first frame of said roll film to be exposed during the first photography effected using said roll film loaded in said camera housing is disposed at a predetermined position in said camera housing;
    metering means producing an output responsive to the brightness of the object to be photographed; and
    means for comparing the output of said metering means with a reference value and thereby detecting the deficiency of the brightness of said object for photography and biasing said driving means and wherein said blocking means varies the relative relationship between the output of said metering means and said reference value.

2. A camera according to claim 1, wherein said blocking means includes means for counting the amount of said roll film advanced by said advancing means and is biased until the amount counted by said counting means reaches a predetermined value.

3. A camera usable with a flash unit and having a roll film loaded in the camera housing thereof, said camera comprising:
    release means operable by an operator for photographing of an object to be photographed;
    means for driving said flash unit in response to said release means so that light may be emitted from said flash unit;
    means for advancing said roll film until a portion corresponding to the first frame of said roll film to be exposed during the first photography effected using the roll film loaded in said camera housing is disposed at a predetermined position in said camera housing, said advancing means being biased by said release means being operated; and
    means for blocking the operation of said driving means until the advance of said roll film by said advancing means is completed.

4. A camera according to claim 3, wherein said blocking means includes means for counting the amount of said roll film advanced by said advancing means and is biased until the amount counted by said counting means reaches a predetermined value.

5. A camera according to claim 3, wherein said advancing means includes a film advancing mechanism, an electric motor for driving said mechanism and circuit means for controlling the power supply to said electric motor, and said blocking means includes means for detecting an over-load applied to said electric motor and is biased until said over-load is detected by said detecting means.

6. A camera provided with a camera housing, a flash unit provided in said housing, and a projecting device for causing the light-emitting portion of said flash unit to project outwardly of said housing and thereby enable light emission, and using a roll film, said camera comprising:
    release means operable by an operator for photographing of an object to be photographed;
    driving means for detecting the deficiency of the brightness of said object for photography and operating said projecting device to cause said light-emitting portion to project;
    means for advancing said roll film in said camera housing in response to said release means; and
    means for blocking the operation of said driving means until a portion corresponding to the first frame of said roll film to be exposed during the first photography effected using said roll film loaded in said camera housing is disposed at a predetermined position in said camera housing.

7. A camera according to claim 6, wherein said blocking means includes means for counting the amount of said roll film advanced by said advancing means and is biased until the amount counted by said counting means reaches a predetermined value.

8. A camera usable with a flash unit and having a roll film loaded in the camera housing thereof, said camera comprising:
    release means operable by an operator for photographing of an object to be photographed;
    means for driving said flash unit in response to said release means so that light may be emitted from said flash unit;
    means for advancing said roll film in said camera housing in response to said release means; and
    means for blocking the operation of said driving means until a portion corresponding to the first frame of said roll film to be exposed during the first photographing effected using said roll film loaded in said camera housing is disposed at a predetermined position in said camera housing.

9. A camera according to claim 8, further comprising means for metering the brightness of the object to be photographed and including means producing an output when the brightness of said object is lower than a predetermined value, and wherein said driving means is enabled when said output is produced by said producing means.

* * * * *